United States Patent
Loviken et al.

(10) Patent No.: US 12,482,042 B2
(45) Date of Patent: Nov. 25, 2025

(54) PLANNING AND DEPLOYING MULTIPLE ASSETS FOR PROJECTS

(71) Applicant: Schlumberger Technology Corporation, Sugar Land, TX (US)

(72) Inventors: Pontus Loviken, Palaiseau (FR); Peter Gregory, Cambridge (GB)

(73) Assignee: Schlumberger Technology Corporation, Sugar Land, TX (US)

(*) Notice: Subject to any disclaimer, the term of this patent is extended or adjusted under 35 U.S.C. 154(b) by 34 days.

(21) Appl. No.: 18/539,452

(22) Filed: Dec. 14, 2023

(65) Prior Publication Data
US 2024/0221094 A1 Jul. 4, 2024

Related U.S. Application Data (60) Provisional application No. 63/477,573, filed on Dec. 29, 2022.

(51) Int. Cl.
*G06Q 10/00* (2023.01)
*G06Q 10/0631* (2023.01)
*G06Q 50/02* (2012.01)

(52) U.S. Cl.
CPC ....... *G06Q 50/02* (2013.01); *G06Q 10/06313* (2013.01)

(58) Field of Classification Search
None
See application file for complete search history.

(56) References Cited

U.S. PATENT DOCUMENTS

| | | | | |
|---|---|---|---|---|
| 8,306,887 B1* | 11/2012 | Bucholtz | ............... | G06Q 40/00 705/300 |
| 2011/0172976 A1* | 7/2011 | Budiman | ............... | E21B 47/04 703/2 |
| 2015/0051941 A1* | 2/2015 | Bell | ............... | G06Q 10/06313 705/7.25 |

(Continued)

OTHER PUBLICATIONS

Chaikine, Ilia, a machine learning model for predicting multi-stage horizontal well production, 2021, Journal of Petroleum Science and Engineering, 198 (2021) 108133, https://www.sciencedirect.com/science/article/pii/S0920410520311876, p. 1-16. (Year: 2021).*

(Continued)

*Primary Examiner* — Joseph M Waesco
(74) *Attorney, Agent, or Firm* — Jeffrey D. Frantz

(57) ABSTRACT

A method may include receiving, via one or more processors, a first dataset associated with a plurality of projects that corresponds to performing hydrocarbon exploration or processing operations. The method may then involve receiving a second dataset associated with a plurality of assets, such that at least a portion of the plurality of assets is used to complete at least a portion of the plurality of projects. The method may also involve determining a plurality of schedules for deploying the at least a portion of the plurality of assets for use with the at least a portion of the plurality of projects, identifying a portion of the plurality of schedules based on an optimization algorithm with respect to revenue, and sending a notification indicative of the portion of the plurality of schedules to a computing device, wherein the computing device is configured to display the notification via an electronic display.

12 Claims, 5 Drawing Sheets

(56) References Cited

U.S. PATENT DOCUMENTS

| | | | | |
|---|---|---|---|---|
| 2015/0088569 | A1* | 3/2015 | Fernandez | G06Q 10/063114 |
| | | | | 705/7.15 |
| 2015/0142315 | A1* | 5/2015 | Guzzo | E21B 41/0007 |
| | | | | 702/6 |
| 2015/0356521 | A1* | 12/2015 | Sridhar | G06Q 10/06316 |
| | | | | 705/305 |
| 2018/0230780 | A1* | 8/2018 | Klenner | E21B 43/121 |
| 2019/0244150 | A1* | 8/2019 | Furman | G06Q 10/06313 |
| 2020/0175441 | A1* | 6/2020 | Sukhobokov | G06Q 10/06313 |
| 2020/0349511 | A1* | 11/2020 | Seaver | G06Q 10/06312 |
| 2021/0073540 | A1* | 3/2021 | Tran | G06T 7/0002 |
| 2021/0112705 | A1* | 4/2021 | Coolidge | G06Q 10/103 |
| 2021/0191756 | A1* | 6/2021 | Chen | G06F 9/5038 |
| 2021/0318464 | A1* | 10/2021 | Tawil | E21B 44/00 |
| 2021/0406792 | A1* | 12/2021 | Bhardwaj | G06N 20/20 |
| 2022/0083040 | A1* | 3/2022 | Akkaram | G05B 23/0289 |
| 2022/0127933 | A1* | 4/2022 | Snoswell | B60L 53/80 |
| 2022/0180271 | A1* | 6/2022 | Baker | G06Q 10/06312 |
| 2022/0341309 | A1* | 10/2022 | Braniff | G08B 21/187 |
| 2023/0252382 | A1* | 8/2023 | Simpson | G06Q 50/02 |
| | | | | 701/410 |

OTHER PUBLICATIONS

International Search Report and Written Opinion of International Patent Application No. PCT/US2023/083950 dated on Apr. 5, 2024, 10 pages.

* cited by examiner

PLANNING AND DEPLOYING MULTIPLE ASSETS FOR PROJECTS

CROSS-REFERENCE TO RELATED APPLICATION

This application claims priority to and the benefit of U.S. Provisional Patent Application Ser. No. 63/477,573, entitled "PLANNING AND DEPLOYING MULTIPLE ASSETS FOR PROJECTS," filed Dec. 29, 2022, which is hereby incorporated by reference in its entirety for all purposes.

FIELD OF THE INVENTION

The present disclosure relates to systems and methods for planning deployment of assets to projects and performing budget monitoring operations for projects.

BACKGROUND INFORMATION

A project or job undertaken by an entity may use many assets (e.g., equipment) to complete the various tasks associated with the project. In some cases, the entity may be involved with several projects that may involve the use of the same type of asset. Since the entity may have limited amount of each type of asset, the entity may plan the deployment of assets in such a manner to maximize the use of the assets for the various projects undertaken by the entity. That is, to use assets efficiently, it is desirable to plan the deployment of various assets for the projects in such a manner to maximize the output of the pending jobs.

With this in mind, it should be noted that asset deployment planning involves complicated tasks that include generating a deployment plan for each asset to ensure that jobs may have assets for performing related tasks at the appropriate times. Accordingly, it is desirable to have a system to provide improved process systems for planning asset allocation and bidding.

SUMMARY

A summary of certain embodiments described herein is set forth below. It should be understood that these aspects are presented merely to provide the reader with a brief summary of these certain embodiments and that these aspects are not intended to limit the scope of this disclosure.

In one embodiment, A method may include receiving, via one or more processors, a first dataset associated with a plurality of projects that corresponds to performing hydrocarbon exploration or processing operations. The method may then involve receiving a second dataset associated with a plurality of assets, such that at least a portion of the plurality of assets is used to complete at least a portion of the plurality of projects. The method may also involve determining a plurality of schedules for deploying the at least a portion of the plurality of assets for use with the at least a portion of the plurality of projects, identifying a portion of the plurality of schedules based on an optimization algorithm with respect to revenue, and sending a notification indicative of the portion of the plurality of schedules to a computing device, wherein the computing device is configured to display the notification via an electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As mentioned above, the present embodiments described herein are related to determining efficient plans for deploying assets that may be commonly used by different projects in an efficient manner. With this in mind, in some embodiments, a planning system may receive data related to a number of projects that may be executed in a set of different locations, such that each project may involve using a certain set of assets. In addition, the planning system may receive data related to the assets that are available for deployment to the projects, the assets that are currently in use, schedules for the assets, locations of the assets, and the like. Based on the collected data, the planning system may employ one or more algorithms to determine a deployment plan that satisfies or completes all of the available projects using the assets and their projected availability schedules. That is, the planning system may process the data related to the assets that are to be used for the projects and determine a deployment plan that allows each of the projects to be completed within a desired time frame while sharing one or more of the assets amongst different projects at different times. Indeed, the planning system may determine deployment schedules for each asset to satisfy all of the available projects and allow for a minimum amount of assets to be used to finish each project within the desired time. If the amount of available assets is too low to perform all the jobs, the planning system may indicate that a plan cannot be determined for completing the projects with the available assets. In other words, the planning system may evaluate a set of available projects and assets and immediately return the optimal plan for each asset to satisfy all the projects, if such a plan exists.

However, if such a plan does not exist, the planning system may identify subsets of projects that can be completed. To efficiently identify subsets of projects to test to determine whether each project of each respective subset of projects can be completed, the planning system may analyze the possible solutions by a node-value heuristic that approximates a value for each node (e.g., project) for each possible deployment plan. That is, the planning system would first evaluate subsets of projects that are associated with higher revenues as compared to other subsets of projects. By way of example, a heuristic of average revenue per job may be evaluated for each possible deployment plan (e.g., subset of projects) to determine possible total revenues for each deployment path, which accounts for the possible projects that may be undertaken with the respective asset deployment plan. After the possible total revenues are determined, the planning system may evaluate the subset of projects having the highest possible total revenues to determine whether the respective subset of projects can be performed based on the project timeline data, the asset data, the asset shipping timeline, and the like. By determining the deployment plan in accordance with the embodiments presented herein, the planning system may efficiently process and identify one or more solutions to asset constraints issues to maximize a revenue or some other variable. Indeed, the embodiments presented herein allow the planning system to perform analysis using fewer computing resources (e.g., memory, energy) as compared to other methodologies by identifying sets of solutions and parsing through the set of solutions in a random fashion. Additional details regarding the embodiments described above will be detailed below with reference to FIGS. 1-5.

Figure 1:
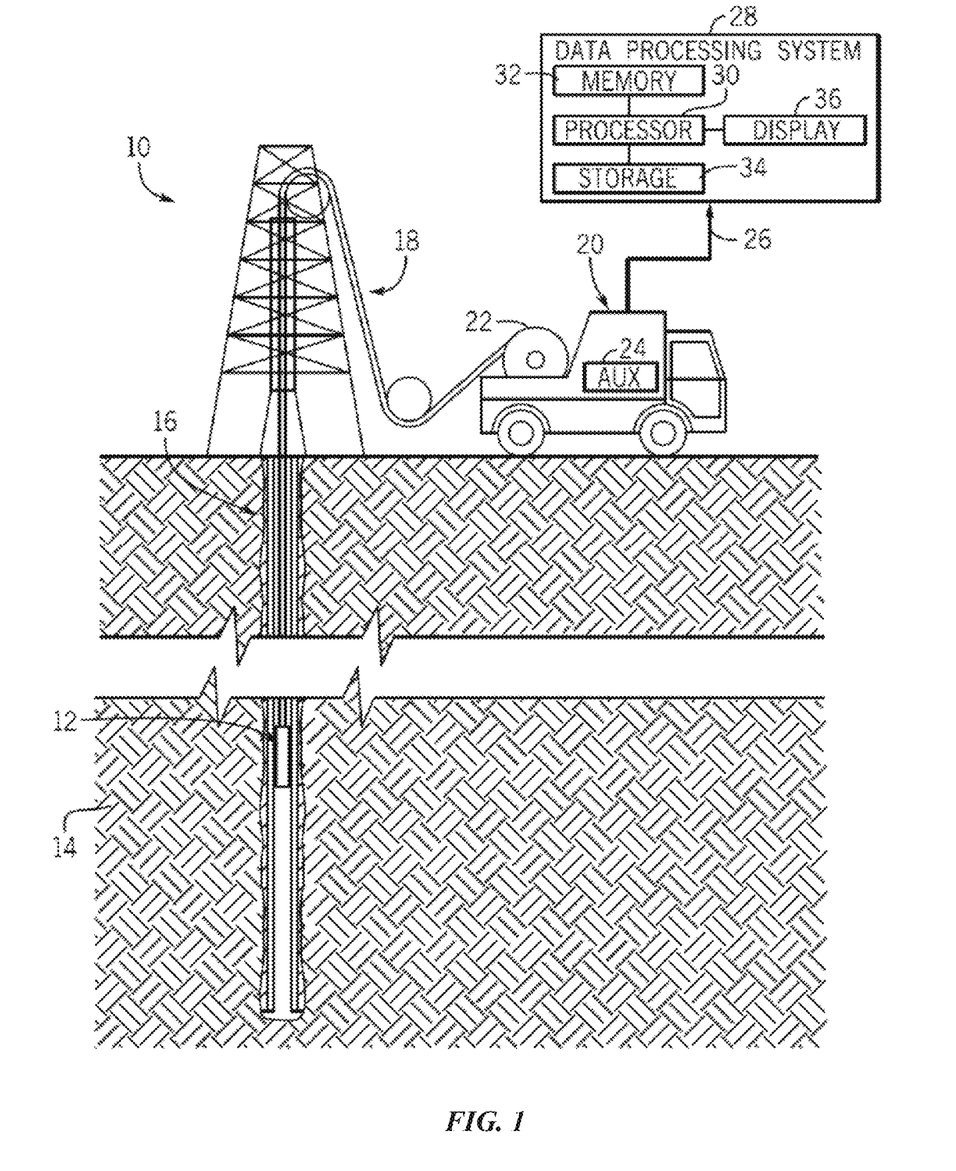
FIG. 1 illustrates a schematic view of an example project site for performing a well logging operation, in accordance with an aspect of the present disclosure.

By way of introduction, FIG. 1 depicts a schematic diagram of a system for an example project that may utilize the planning system discussed above. Referring briefly to FIG. 1, FIG. 1 illustrates a well-logging system 10 that may include example types of assets or equipment that may be deployed to a project site, such as the well-logging system 10. By way of example, the well-logging system 10 may be used to convey a downhole tool 12 through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that obtains logging measurements through depths of the wellbore 16. Indeed, it should be appreciated that different measurements may be obtained by different logging tools and/or logging systems.

Many types of downhole tools may obtain logging measurements in the wellbore 16. These include, for example, nuclear magnetic resonance (NMR) tools such as the Combinable Magnetic Resonance (CMR) tool, the Magnetic Resonance Scanner (MRX) tool, and the ProVISION tool by Schlumberger Technology Corporation. In general, NMR tools may have a permanent magnet that produces a static magnetic field at a desired test location (e.g., where the fluid is located). The static magnetic field produces an equilibrium magnetization in the fluid that is aligned with a magnetization vector along the direction of the static magnetic field. A transmitter antenna produces a time-dependent radio frequency magnetic field that is perpendicular to the direction of the static field. The radio frequency magnetic field produces a torque on the magnetization vector that causes it to rotate about the axis of the applied radio frequency magnetic field. The rotation results in the magnetization vector developing a component perpendicular to the direction of the static magnetic field. This causes the magnetization vector to align with the component perpendicular to the direction of the static magnetic field, and to process around the static field.

The downhole tool 12 may provide logging measurements 26 to a data processing system 28 via any suitable telemetry (e.g., via electrical signals pulsed through the geological formation 14 or via mud pulse telemetry). The data processing system 28 may process the logging measurements 26 to identify patterns in the logging measurements 26. The patterns in the logging measurements 26 may indicate certain properties of the wellbore 16 (e.g., viscosity, porosity, permeability, relative proportions of water and hydrocarbons, and so forth) that might otherwise be indiscernible by a human operator.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties (e.g., downhole fluid volumes) in the geological formation 14 or the wellbore 16 based on the logging measurements 26.

Although FIG. 1 illustrates an example project of the well-logging system 10, it should be understood that the embodiments described below may be employed for any suitable project in which assets are requested and a plan for projects to undertake and assets to be deployed are to be determined. Indeed, the present embodiments described herein are directed to a planning system 40 that may receive data related to projects that may be undertaken in the future and data related to the locations and availability of assets that may be used for the respective projects.

Keeping this in mind, the planning system 40 may receive a first dataset related to a first set of projects, such two or more of the projects may be in different locations. The first dataset may also include details related to performing the job, such as a timeline, schedule, a list of assets, and the like. In this way, each project may be associated with a list of assets (e.g., downhole tool 12) to perform the respective project. By performing the embodiments described herein, the planning system 40 may use the collected data to efficiently (e.g., using fewer computing resources and time) to find the smallest set of assets or resources that may be used to perform each of the set of projects. That is, given a set of projects, the planning system 40 may determine a deployment or schedule of use plan for each asset to ensure that each project may be completed according to a desired deadline. Indeed, so long as a sufficient amount of assets are available to perform the projects according to their desired timelines considering time of use, time to transport, and other timing aspects related to providing the associated assets to each respective project.

However, in the instance in which there is not a sufficient amount of assets to complete each project according to a respective desired timeline, the planning system 40 may search for an optimal subset of projects to prioritize and recommend performing by maximizing some variable, such as total revenue, amount of time, and the like. In some embodiments, the planning system 40 may solve this optimization problem while first a relative priority assigned each project relative to other projects in the set.

Figure 2:
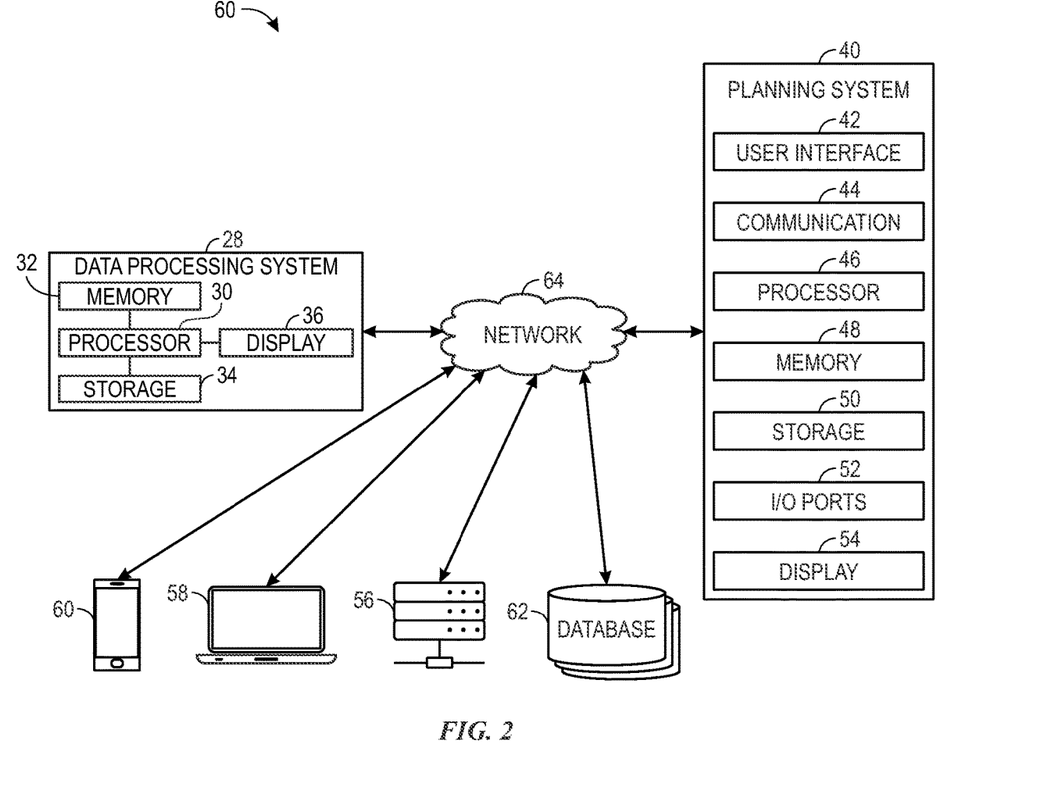
FIG. 2 illustrates a block diagram of a planning system, in accordance with an aspect of the present disclosure.

With the foregoing in mind, FIG. 2 illustrates example components of the planning system 40. By way of example, the planning system 40 may include a user interface 42, a communication component 44, a processor 46, a memory 48, a storage component 50, input/output (I/O) ports 52, a display 54, and the like. The user interface 42 may include any suitable input component, such as a keyboard or display, that may enable a user to provide commands, execute applications, or perform operations via the planning system 40.

The communication component 44 may be a wireless or wired communication component that may facilitate communication between different systems, gateway communication devices, various control systems, and the like. The processor 46 may be any type of computer processor (e.g., multi-core) or microprocessor capable of executing computer-executable code. The memory 48 and the storage component 50 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 46 to perform the presently disclosed techniques. The memory 48 and the storage component 50 may also be used to store data received via the I/O ports 52, data analyzed by the processor 46, or the like.

The I/O ports 52 may be interfaces that may couple to various types of I/O modules such as sensors, programmable logic controllers (PLC), and other types of equipment. For example, the I/O ports 52 may serve as an interface to components that may be part of the well-logging system 10. The I/O ports 52 may also serve as an interface to enable the planning system 40 to connect and communicate with surface instrumentation, servers, computing devices, and the like. Connection between the I/O ports 52 and other equipment may be a wireless or wired communication.

The display 54 may include any type of electronic display such as a liquid crystal display, a light-emitting-diode display, and the like. As such, data acquired via the I/O ports 52 and/or data analyzed by the processor 46 may be presented on the display 54. In certain embodiments, the display 54 may be a touch screen display or any other type of display capable of receiving inputs from an operator. Although the planning system 40 is described as including the components presented in FIG. 2, the planning system 40 should not be limited to including the components listed in FIG. 2. Indeed, the planning system 40 may include additional or fewer components than described above. Further, the components of the planning system 40 may also be included in a server 56, a computing device 58, a mobile computing device 60, and the like.

As shown in FIG. 2, the planning system 40 may be communicatively coupled to the data processing system 28, the server 56, the computing device 58, the mobile computing device 60, and a database 62 via a network 64. The network 64 may be any suitable network that may facilitate communication between the various devices.

For example, the server 56 may communicate with the planning system 40 via the network 64. In some embodiments, the planning system 40 may employ the server 56 to assist the planning system 40 performing the processes that will be detailed below. The server 56 may include a collection of computing resources that may perform computing analysis and processes across the collection of resources. As such, the server 56 may include a collection of computing devices, a cloud-computing system, or any suitable computing resource that may include more processing capabilities than the planning system 40.

The planning system 40 may communicate or access the database(s) 62, which may store data related to the available projects, available assets, information related to the projects and assets, and the like. The database 62 may also include a collection of deployment plans and schedules that may have been implemented over time.

In some embodiments, the computing device 58 may include a personal computer (PC), a laptop computer, or other suitable computing device. In the same manner, the mobile computing device 60 may include a smartphone, a tablet device, or any other suitable compact computing device. The computing device 58 and the mobile computing device 60 may communicate with the planning system 40 and may operate as the user interface 42 to control operations of the planning system 40. It should be noted that the embodiments described herein may be performed in any suitable computing device such as the server 56, the computing device 58, the mobile computing device 60, or the like. However, certain devices may provide advantages of use over others due to the respective properties of the respective computing device.

With the foregoing in mind, it should be noted that the planning system 40 may perform two core functionalities. First, the planning system 40 may determine a schedule that may enable each project of a set of projects to be completed with respective desired time frames using available resources and assets for the respective projects. In some embodiments, the planning system 40 may determine deployment and use schedules for each asset for each project, such that the determined schedule is optimal with regard to using the least amount of assets possible. By way of example, the planning system 40 may determine a minimal amount of assets to use for each project by planning to first supply more assets than requested for a project and then determine a number of assets that the determined schedule uses for the respective project.

Keeping this in mind, in one embodiment, the planning system 40 may employ Algorithm 1 provided below to find the minimal number of assets needed for each asset type for performing all of the projects in the set of projects. If the amount of available assets is less than this minimal number for any asset type (e.g., a threshold number of assets associated with performing each of the projects in the set of projects), the planning system 40 may determine that there is no solution to accommodate all of the projects and may send a notification to a computing device to indicate that no plan is possible.

After determining that it is not possible to accommodate all of the projects, the second core functionality performed by the planning system 40 may include implementing a tree search algorithm, such as a depth-first-search algorithm that searches for an optimal subset of projects with respect to maximizing a total revenue from performing the subset of projects. Indeed, the planning system may account for different priority levels of projects (e.g., user defined priorities, location priorities, revenue priorities), such that projects of higher priorities are selected by the planning system 40 first when determining the optimal subset of projects to perform. Since the number of possible project combinations may increase as the number of projects increases, this algorithm might often not have the time to explore all different combinations and is thus unable to prove that the found solution is the optimal. However, by performing the embodiments described herein, the planning system 40 may use the first initial set of solutions of the search algorithm as the best solutions, as will be detailed below with respect to Algorithm 2 and Algorithm 3.

Keeping the foregoing in mind, the first core functionality may focus on determining an individual plan for each asset that minimizes the number of assets that may be used by the set of the projects by sharing assets between projects in the most effective manner possible such that a given set or subset of projects may be completed while accounting for shipping times to ship the respective asset to each respective project. This functionality can also be used to find the minimum number of assets needed for each asset type, by executing an algorithm with enough available assets, and then determine a number of assets that are used for each asset type in the resulting plan, since the plan would use the minimal number of assets and would then leave unnecessary available assets unused. With this in mind, the first core functionality may have a time complexity of $O(nk \log(k))$ where n is the number of jobs, and k is the average number of required assets per asset type.

When there are not enough assets to do all of the projects, the second core functionality can generate candidate solutions with a time complexity $O(n^2 k^2 \log(k))$ for each solution. Since the search for candidate solutions is not random, the chance of finding the best solution among the first found candidate solutions (e.g., first threshold number of candidate solutions) is greater than among the later found candidate solutions (e.g., after the first threshold number of candidate solutions). As a result, the planning system 40 may avoid evaluating all possible project configurations, thereby minimizing computing resources (e.g., time, power) while finding a solution. In some embodiments, the planning system 40 may implement the solution search can be done in parallel between multiple processors to further decrease the search time.

Figure 3:
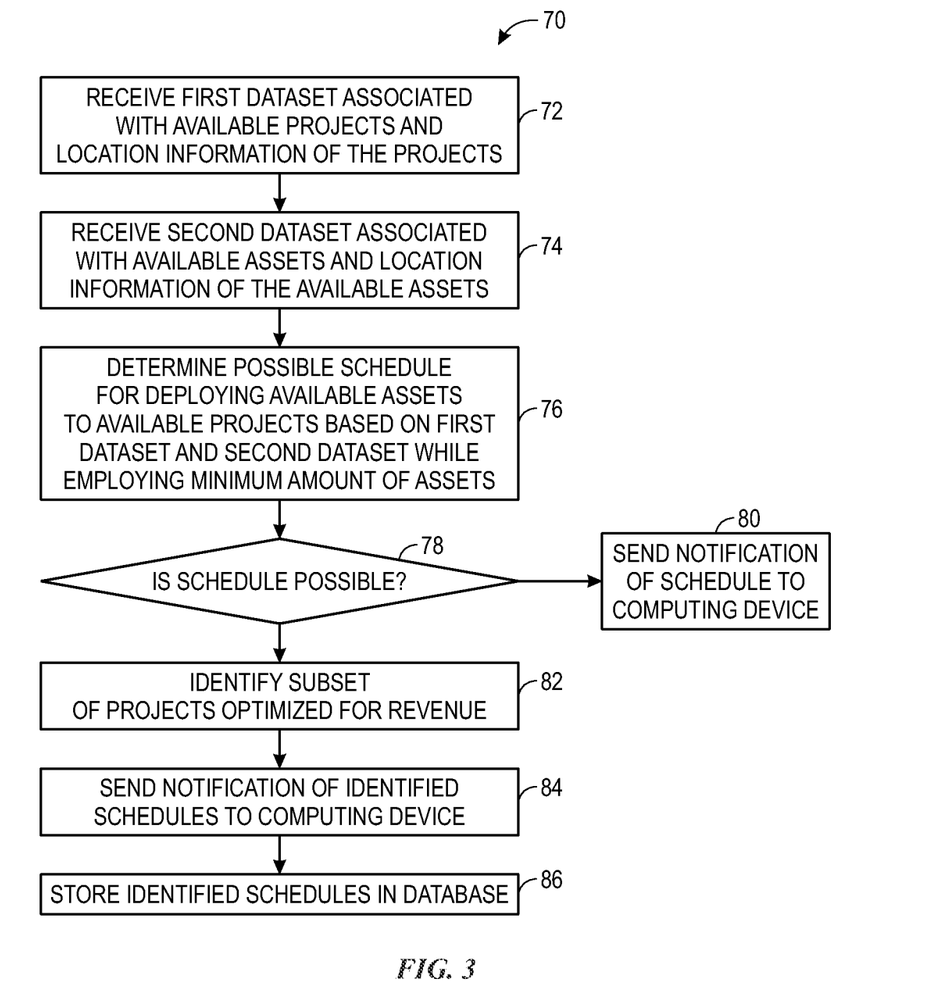
FIG. 3 illustrates a flow chart of a method for generating deployment plans for assets to accommodate various projects, in accordance with an aspect of the present disclosure.

Keeping this in mind, FIG. 3 illustrates a flow chart of a method 70 for determining deployment plans for assets among a set of projects, in accordance with the embodiments described herein. Although the following description of the method 70 is described as being performed by the planning system 40, it should be understood that the method 70 may be performed by one or more suitable computing devices. Further, although the method 70 is described as being performed in a particular order, it should be noted that the method 70 may be performed in any suitable order.

Referring now to FIG. 3, at block 72, the planning system 40 may receive a first dataset including information related to a set of projects or jobs in which assets may be used for completing the respective project. As mentioned above, the projects may include any suitable type of job or set of tasks related to performing an operation in the hydrocarbon extraction or processing tasks. In some embodiments, the first dataset may include various details related to each project, such as location, a set of assets requested to perform the project, an expected revenue for the project, and the like. More specifically, in some embodiments, the planning system 40 may be defined by properties include an identification (ID) number, expected revenues, asset requirements, start date, end date, location, priority level (e.g., user defined, revenue related, time related), and the like. In some embodiments, the priority may be set by a user to indicate that the project is confirmed such that subsets of confirmed projects may no longer be sought or that the project facilitator may be obliged to complete the project regardless of revenue.

The first dataset may be retrieved from the databases 62 or other suitable storage. In some embodiments, the user may input the first dataset or dynamically update the first dataset via the user interface 42 or other suitable input device. In this manner, the planning system 40 may dynamically update the results of the method 70 as the first dataset is updated.

At block 74, the planning system 40 may receive a second dataset associated with assets that are available for use. The second dataset may detail information related to each asset, such as a type of asset, a weight of the asset, dimensions of the asset, shipping instructions for the asset, a current location of the asset, and the like. The assets may include any suitable equipment that may be used to perform the respective projects. As such, the assets may include excavators, drills, drill bits, vibrators, streamers, or any other suitable piece of equipment that may be stored in a particular location and may be shipped or deployed to a project site. In addition, assets may include personnel, skilled workers, expert professionals (e.g., engineers), and the like. By way of example, each project may define certain assets to be used to perform the respective tasks. These assets may not be abundantly available and thus may be shared between projects. In this way, the assets may be shipped between locations in order to satisfy different projects. As an example, assume a case where a project requests two tools of different generic asset types "tool1" and "tool2", which are to be operated by two engineers. The planning system 40 may then described the request in a dictionary as: {tool1: 1, tool2: 1, engineers: 2}. Similarly, the planning system 40 can use similar dictionaries to define a total amount of assets in a given category. For instance, if the planning system 40 received information that 10 instances of tool1 are present, 22 of tool2 are present, and 100 engineers are present, the planning system 40 may express this as: supply={tool1: 10, tool2: 22, engineers: 100}.

Figure 4:
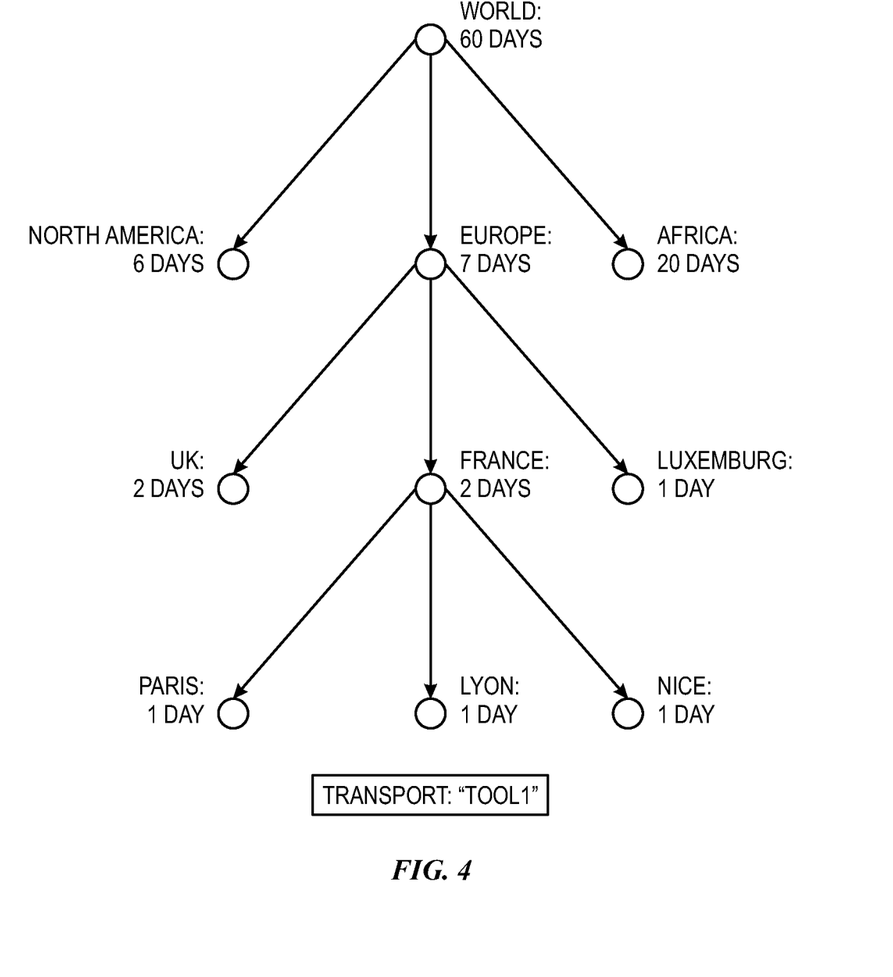
FIG. 4 illustrates a traveling time tree that may be parsed for determining estimating the possible number of projects that may be completed by evaluating a last common node for two locations to determine a time to move an asset between the two locations, in accordance with an aspect of the present disclosure.

After receiving the two datasets, the planning system 40 may, at block 76, determine a set of possible schedules for deploying available assets to the projects provided in the first dataset based on the second dataset while optimizing the use of the least amount of assets. In some embodiments, the planning system 40 may view locations and travel times of assets relative to the locations of projects in a hierarchical manner, such as a traveling time tree as depicted in FIG. 4. For example, referring to FIG. 4, to determine the shipping time between two locations, the planning system 40 may find their closest common node. In one specific case of FIG. 4, a transport of "Tool 1" from London, UK, to Nice, France, would take a maximum of 7 days, as their closest common denominator is the "Europe"-node. Each asset type could in principle have its own traveling time tree.

With this in mind, the planning system may employ a schedule finding algorithm (Algorithm 1) that may take the set of projects defined in the first dataset and a set of assets defined in the second dataset to find a solution that satisfies or enables all of the projects to be completed, while using a minimum amount of resources or assets. If there are not enough resources for this minimal plan, the planning system 40 may determine that there is no solution to perform all the jobs. In some embodiments, the planning system 40 may execute the schedule finding algorithm for one asset at a time.

By way of example, the schedule finding algorithm may be defined as a function of variables including: jobs (e.g., projects), asset quantities, and travel times for each asset type. That is, the schedule finding algorithm may evaluate a single asset type at a time and may be executed separately for each asset type.

---

Algorithm 1 - FindAssetSchedule (jobs, asset quantities, travel times)

➤ Create a list for each individual asset to keep track on the jobs they will do.
➤ for each job in order of starting time:
  ○ Sort the assets by the time they finished their last job (e.g., infinitely ago if no jobs)
  ○ Select the assets with last finishing times and enough time for shipping.
  ○ if not enough assets can be found:
    ■ return None    (e.g., no plan can be found)
  ○ else
    ■ Add the job to the lists of the selected assets
➤ return the job lists of each individual asset.

---

As shown above, the schedule finding algorithm may assign assets to each job (e.g., project), such that a minimal amount of assets is used. The algorithm will stop if the job requirements cannot be met, and return the job assignments of each individual asset, if a plan can be found. As mentioned above, the time complexity of this algorithm is O (nk log(k)) where n is the number of jobs, and k is the number of assets.

To determine a minimal plan in terms of used resources (e.g., assets), the planning system 40 may select the asset for use that has been most recently released from its previous project, thereby maximizing an amount of time for the remaining assets to be sent to any later job. For example, assuming a job j requires an asset, and there are two possible assets $a_1$ and $a_2$ that could be shipped in time to do the job, and that asset $a_1$ has completed its previous job before asset $a_2$, the planning system 40 may defer to using asset $a_1$ in the job j to minimize the total amount of assets used for the projects defined in the first dataset.

To clarify, when considering the next job after j, the planning system 40 may infer that there are no jobs that asset $a_2$ can do if asset $a_1$ is used for job j that asset $a_1$ cannot do if asset $a_2$ is used for job j. With this in mind, the planning system 40 may consider a location node n, as shown in FIG. 4, as the closest node so that the previous location of both assets and the location of the new job is under the location node n. If the asset $a_1$, that finished its previous job in time, has enough time to reach the new job, it also has enough time to be moved anywhere within that node n. Indeed, considering that both assets $a_1$ and $a_2$ may have enough time to travel to the new job and asset $a_1$ has had more time than asset $a_2$, asset $a_1$ may be shipped to any job within node n prior to asset $a_2$. That is, asset $a_2$ may be guaranteed to be shipped to any location under the closest node of itself and the job j, which is a node under, or equal to n. For jobs outside of node n, the traveling time of each asset $a_1$ and $a_2$ is the same. As such, only the starting time needs to be considered to facilitate the most versatile use of resources. That is, if there is not enough time to ship the asset $a_1$ to a subsequent job j+1 (if $a_2$ was used for job j), there would have been no way to ship $a_2$ in time for j+1 (if $a_1$ was used for job j), considering that job j+1 has a starting date later or equal to job j. In this way, the planning system 40 may automatically select the latest available asset (e.g., that has the least time between the two jobs) when determining likely schedules for assets to deploy to projects to provide optimal flexibility for future jobs.

For instance, if asset $a_1$ is in the U.S. and asset $a_2$ is in France, and the new job is Belgium, it's likely that asset $a_2$ can get shipped to Belgium before asset $a_1$ even if asset $a_1$ is released earlier. However, if there is enough time for asset $a_1$ to be shipped to Belgium in time, there's also likely enough time to ship asset $a_1$ to any other place under the common node of U.S. and Belgium (perhaps the world node). Since assets are assigned to jobs by iterating over the jobs by their starting date, it means that any later job that are analyzed will have a starting date that is later than or equal to the one currently being considered. In this way, there will be no subsequent job to the Belgium job that asset $a_1$ can't reach in time that asset $a_1$ could not also reach. It's therefore better to assign asset $a_2$ to the new job and save asset $a_1$ for the subsequent job j+1, since it will have enough time to be moved anywhere in the world, while asset $a_2$ might only have enough time to be moved anywhere in Europe (should we use asset $a_1$ for the Belgium job). By way of example, if one day after the Belgium job there is one job in China, asset $a_1$ could make it to both these jobs in time, while asset $a_2$ can only make it to the Belgium job. However, if asset $a_1$ is sent to Belgium, no assets will be available to send to China.

To further clarify, consider a new job in Paris, France that request a specific tool. After reviewing the second dataset, the planning system 40 may determine that there are two possible tools that can be used. A first tool was last used in Paris and a second tool was last used in Oslo, Norway. Both tools may have had enough time since their last job to be moved to Paris in time for this new job, but the second tool from Oslo has been released more recently as compared to the first tool. Since their common node is "Europe" this means that the Oslo asset (e.g., second tool) has at least 7 days between the two jobs, and the Paris asset (e.g., first tool) has more than this since the Oslo tool was released more recently. By selecting the Oslo asset for the new job, there will never be a subsequent job that the planning system 40 cannot facilitate that would have been able to be facilitated if the first tool starting in Paris was selected instead.

Indeed, assuming that the next day there would be another job in Oslo. Since the first tool starting in Paris has been unused for longer than the second tool starting in Oslo, it would also have enough time between its previous and this new job to be moved to Oslo. Alternatively, if the next job is in Africa with a shipping time of 60 days from any place in Europe, there may not be enough time for the first tool in Paris to be moved to this location and there will definitely not be enough time for the second tool in Oslo to be moved to this location, as it would have even shorter time between the two jobs than the first tool. As such, by selecting the second tool from Oslo asset for the Paris job may correspond to an optimal asset availability for the subsequent job. Note that the schedule finding algorithm does not attempt to minimize the shipping of tools. Instead, it minimizes the amount of assets used for the set of projects. As such, the planning system 40 may also determine optimum solutions using the same amount of assets where other criteria other than "time unused" is minimized or maximized.

Referring back to FIG. 3, at block 76, the planning system 40 may identify one schedule that employs the least amount of assets and accommodates all of the available projects. At block 78, the planning system 40 may determine whether a schedule is possible. If the schedule is possible, the planning system may proceed to block 80 and send a notification to computing device. The notification may cause the computing device to generate a visualization indicative of the solution. It should be noted that the notifications described herein may be presented via an electronic display of the planning system 40 or another suitable device. Indeed, in some embodiments, the notifications described herein may be transmitted to some electronic device to cause the electronic device to generate a visualization, an alert (e.g., audible, visual, haptic) that may notify a user of the notification. In some embodiments, the notification may cause the receiving device to execute an application or automatically perform some tasks to notify the user regardless of the operational state (e.g., low power mode, sleep mode) of the device.

However, if the planning system 40 determines that the full set of projects defined in the first dataset cannot be satisfied using a set of assets defined in the second dataset (e.g., via travel time tree of FIG. 4) for each asset type, the planning system 40 may then proceed to block 82 and identify an optimal subset of projects that can be done given the available resources (e.g., assets). In some embodiments, the planning system 40 may determine the solution by solving a graph search problem. That is, referring to FIG. 5, each node n may be part of a job subset $\{j_1, j_2, \ldots, j_k\}$ where $j_i$ is the index of a job, and each edge e would be to decide what additional job $\{j_e\}$ to add to this subset. Not all edges are traversable however, since a job only can be added if the resulting node has a valid schedule.

With this in mind, to determine if the resulting node is part of a valid schedule, the planning system 40 may execute the schedule finding algorithm to evaluate a particular node n in the graph. It should be noted that the evaluation of a node n may involve some time to evaluate by the schedule finding algorithm. However, after a particular node n is evaluated, the results of the evaluation may be used in different ways. For instance, if the node n was part of a possible solution or schedule (e.g., a possible schedule was found), any subset of that node should also be possible. Similarly, if a node n was not possible, then any other node n that includes that first node n as a subset cannot be possible either.

In this way, the planning system 40 may determine a subset of projects that can be performed based on previous evaluations of a node n. That is, the planning system 40 may disregard the nodes n that have previously failed in future iterations of the graph search problem. Indeed, the retention of previously evaluated solutions may enable the planning system 40 to incorporate machine learning techniques to avoid inefficient computer processing when evaluating possible solutions. That is, the machine learning techniques may enable the planning system 40 to determine solutions in a more time efficient and less computationally intensive manner.

Figure 5:
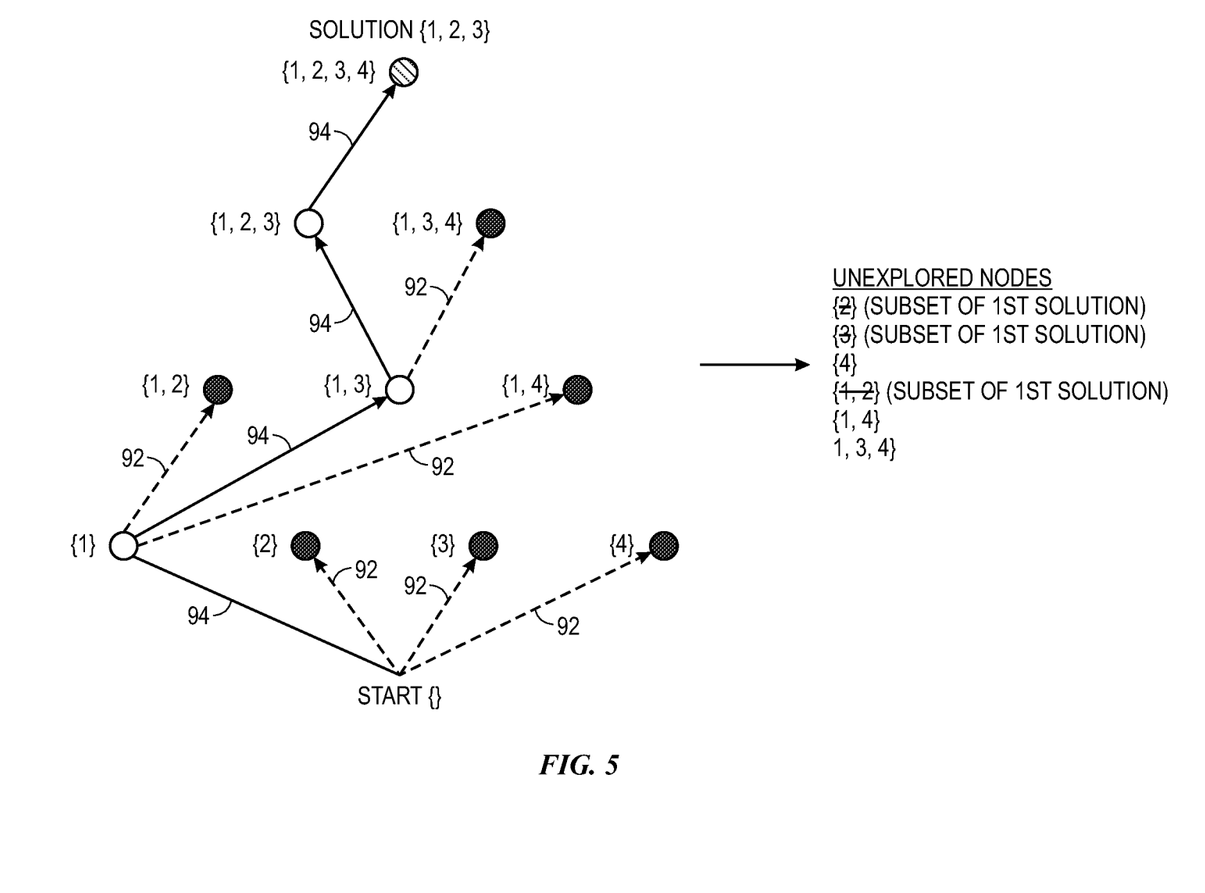
FIG. 5 illustrates an example of a rollout of job-configuration graph, in accordance with embodiments herein.

Referring briefly to FIG. 5, FIG. 5 illustrates an example of a roll-out of job-configuration graph, in accordance with embodiments herein. As shown in FIG. 5, job configuration or project schedules may be evaluated from a starting node {Start}. Arrows 92 correspond to possible actions, while arrows 94 correspond to a chosen action. After the action is chosen for evaluation, the planning system 40 may employ the schedule finding algorithm (e.g., Algorithm 1) to determine the resulting node is possible. If the resulting node is possible, the planning system 40 may store the resulting node. If the resulting node is not possible, the planning system 40 may store the unachievable node in a storage component or list, such that the planning system 40 does not evaluate the node in the future, and neither any other node of which the set of jobs in the unachievable node forms a subset, for the same datasets received at blocks 72 and 74. Once no more jobs can be added to the set of jobs, the planning system 40 may determine that a solution has been found. To search for another solution, the planning system 40 may restart in any node that has not yet been attempted. As such, the planning system 40 may dismiss nodes that are subsets of previous solutions to exclude the possibility of rediscovering the same solutions.

It should be noted that when evaluating the job-configuration graph, the planning system 40 may identify many potential ways to reach a node n. For instance, referring to FIG. 5, the node $\{1,2\}$ could be reached by performing $\{Start\} \rightarrow \{1\} \rightarrow \{1,2\}$ and $\{Start\} \rightarrow \{2\} \rightarrow \{1,2\}$. As such, if the planning system 40 wants to be sure to search for novel solutions, the planning system 40 may avoid exploring nodes that are subsets of previously tested nodes. Indeed, if the planning system 40 knows that node $\{1,2\}$ is possible by stepping through $\{1\}$, then the planning system 40 has no reason to test if $\{2\}$ is possible. Moreover, after a job includes at least one job not seen in another node, the planning system 40 may refrain from changing any job to include that node. Referring again to FIG. 5, after reaching a point where there are no valid edges, the planning system 40 may have reached a leaf of the job-configuration graph. In this way, the planning system 40 may consider this as one possible solution to the job search problem.

In some embodiments, the planning system 40 may evaluate the job-configuration graph detailed above to identify a subset of solutions that optimizes for another variable, such as the total revenue of the included jobs or projects. That is, since each possible solution may exclude some jobs or projects, the planning system 40 may work efficiently identify the optimal set of projects or jobs to perform while maximizing some variable, such as revenue. In other words, when all of the projects cannot be performed, the planning system may iteratively evaluate subsets of solutions using the previously evaluated nodes n. For instance, a subset of solutions may be found by starting with a small subset that can be done, and then jobs are added to this subset one by one as long as the planning system 40 can find a solution using the schedule finding algorithm. Once no more jobs can be added, the planning system 40 may have one solution or roll-out. The planning system 40 may then restart a new rollout by finding a new starting subset, chosen so that it is not itself a subset of any earlier solutions. Referring to FIG. 5, if {1,2,4} is the first solution (e.g., adding 3 wouldn't result in a schedule), then the planning system 40 can't start in {2,4} since it's already part of the first solution. Instead, the planning system 40 could start in {3}. Another example may include having 2 solutions: {1,2} and {2,3} (e.g., solutions in which nothing else can be added). In this case, the planning system 40 could start in {1,3} since it's not a subset of any solution. The planning system 40 may add {4} to this because nothing from the previous solutions indicates that it's not doable. Instead, the planning system just knows that {1,2,4} and {2,3,4} doesn't work (since if it did they would not be solutions/leaf). To optimize the chances of finding something new that is a solution, the planning system 40 avoids trying anything that differs more than a single job from a previously determined legal node (e.g., node that is confirmed legal or valid using Algorithm 1).

As such, the planning system 40 may start in a node that is not a subset of any previous solution and add more jobs until additional jobs can no longer be added using the schedule finding algorithm to confirm that the added jobs can be performed and is "legal." That is, after additional jobs can no longer be added, the planning system 40 may identify a new solution and register this new solution in a storage component. The planning system 40 may then restart the process in a different node that is not a subset of any previous solution. As such, any leaf found by from this node is a new solution. After there are no more nodes that are not part of any previous solution, the planning system 40 may determine that it has explored the full tree.

To generate solutions more efficiently, in some embodiments, the planning system 40 may apply a node-value heuristic that approximates the value of each node to guide the choice of starting node, as well as what edge to follow. This heuristic can take many different forms and depend on the problem at hand. In general, the planning system 40 may find that the heuristic of average revenue per project may enable the planning system 40 to identify a solution that maximizes revenue. In other embodiments, the planning system 40 may determine an average revenue amount per number of assets used. As such, when performing the depth-first search algorithm described above, the planning system may use the heuristic to make a choice when deciding between which node to explore next. Indeed, since the planning system 40 is more likely to find the best job configurations during the initial set of solutions (e.g., less than first threshold number of solutions), the chance of finding a better solution goes down as more solutions are determined. In some embodiments, the planning system 40 may stop the search and assume that we already have the optimal solution after a threshold number of solutions are identified, a percentage of branches have been explored, or the like.

By way of example, the depth-first search algorithm may be performed using Algorithms 2 and 3 as detailed below. It should be noted that the planning system 40 may perform multiple rollouts that can then be made in parallel by starting in different nodes and exclude some jobs in some rollouts. As an example, start nodes {1} (exclude job 2), {2} (exclude job 1), and {1,2} will explore different branches as they can never move to the same nodes.

Referring first to Algorithm 2, this algorithm may start with a subset of jobs and add more jobs to it by value, where the value may include the revenue of the job. After no additional jobs can be added to the solution, the planning system 40 may return the set of jobs. The planning system 40 may then determine if the nodes are possible using Algorithm 1 as described above.

---
Algorithm 2 - Rollout(start node)
---
➢ current node ← start nod
➢ create an empty list for untested nodes
➢ while True:
  ○ test the adjacent nodes to current node in order by heuristic until a valid node is found
  ○ if a valid node is found:
    ■ current node ← found node
    ■ add untested nodes to untested nodes list
  ○ else:
    ■ % Current node is a leaf node
    ■ return current node, list with untested nodes
---

The overall time complexity of Algorithm 2 may be determined by assuming m asset types with k individual assets of each on average and n jobs using each asset on average. With this in mind, each roll-out will attempt at most every job one time. If the roll-out attempt is successful, the job is added to the job subset. If not, the job is added to the list of subsets not to try again since the planning system 40 determines that it does not work with the subset of jobs that has already been identified. It should be noted, that the planning system 40 may use Algorithm 1 to be run m time. As such, each such evaluation has a time complexity of $O(nk \log(k))$. In total, the time complexity for each roll-out is $O(mn^2k \log(k))$. As such, the amount of solutions explored depends on the goal. If the goal is to have an optimal solution (e.g., with respect to revenue or other factor), the planning system 40 may explore the complete graph or at least until the found solutions have less than some average threshold revenue. On the other hand, if the goal is to simply have one of the optimal possible plans, the planning system 40 may sample a threshold number of solutions to fit their values to a normal distribution and identify the most optimal solution that is within the percentile of choice.

In some embodiments, after applying Algorithm 2, Algorithm 3 may be used to explore the possible subsets of jobs that can be performed based on the available assets provided in the second dataset. Using the heuristic, the planning system 40 may first evaluate job combinations that more than a threshold total revenue path as compared to those that have less than the threshold revenue path. It should be noted that by performing Algorithm 3 some branches may not be evaluated. As such, the planning system 40 may save a list of all unexplored nodes. In some embodiments, instead of saving the list of all unexplored noes, the planning system 40 may only save a list of the first unexplored node of each roll-out. In this way, the number of unexplored nodes stored in the list will be limited to preserve storage and prevent exponential growth of the list.

---
Algorithm 3 - JobSubsetSearch(priority level = 0)
---
➢ create a list for all solutions
➢ untested nodes ← [ ]
➢ if priority level is maximum:
  ○ current node ← { }    % Empty set
➢ else:
  ○ current node ← JobSubsetSearch(priority level + 1)
➢ while exploring solutions: % Limit by iterations, time, or any other criterion -continued Algorithm 3 - JobSubsetSearch(priority level = 0)

○ new solution, new untested nodes ← Rollout (current node)
○ add the new solution to solution list
○ add the new untested nodes to list of untested nodes
○ remove from list untested nodes that are subsets of solutions
○ (optionally) only keep the N untested nodes with highest values
○ test the untested nodes by value until a legal is found
➢ if a legal node is found:
  ○ current node ← found node
➢ else:
  % No more solutions to explore
  ○ break out of the loop
➢ return solution with highest total revenue Referring to Algorithm 3, the planning system 40 may use Algorithm 3 to decide on each starting node, after a roll-out is made using Algorithm 2, where Algorithm 2 is using Algorithm 1 to evaluate if nodes are legal or not. In each roll-out there will be many nodes that can be tested, since there are many possible jobs that can be added at any time in order to create a new node to try. In some embodiments, these potential nodes may be tested in the order of the heuristic, to start with the set of jobs that will be most profitable if they work. Once a legal node is found, the planning system 40 may move to that node, while possibly saving the untested nodes as potential starting nodes for a different rollout. In some cases, the generated list may become longer than some threshold. As such, the planning system 40 may save a short list by only saving the nodes from the starting node during the rollout (since all other nodes can be reached from it), or to only save the most profitable nodes (if they happen to be legal). Another way in which the list potential starting nodes is filtered is by removing nodes that are subsets of earlier solutions, or nodes that includes subsets that have previously been found illegal (if $\{1,2,3\}$ is illegal, so is $\{1,2,3,4\}$ . . . ).

At block 84, the planning system 40 may send a notification of the subset of schedules or subset of jobs that can be performed to the computing device associated with a user. The notification may include a list of the subset of jobs along with corresponding expected revenue figures for the respective schedule. As such, the maximum revenue schedule may be positioned at the beginning of the list. At block 86, the planning system 40 may store the identified schedules or subset of jobs in a storage component, such as the database 62. In this way, the planning system 40 may perform the method 70 again with updated dataset, while avoiding analyzing certain schedules that may not be possible or may not be optimized for a particular variable. That is, the planning system 40 may implement a machine learning algorithm to avoid evaluating certain branches in subsequent analysis of the possible schedules to reduce overall processing operations and time.

With the foregoing in mind, in some instances, the expected revenues associated with a project may be based on estimates provided by employees or other individuals. Indeed, in a large organization in which resources (e.g., assets) are to be shared among different subdivisions, the selection of projects to undertake may be driven by maximizing the expected revenues for the project combination that can be completed. However, there may be a conflict between maximizing revenues for individual subdivisions and optimizing revenue for the organization as a whole. Since each subdivision may intend to maximize its own revenue, there may be an incentive to overestimate the estimated revenue for a particular job or project to increase the chance of the job or project being selected. If certain subdivisions employ this tactic, the other subdivisions that accurately estimate their revenues may risk not being selected even if they would have provided higher value to the organization as a whole. They might even get punished or suffer cut backs as they are not able to do show sufficient activity. Further, the inflated estimated revenues may risk not maximizing the overall organizations' actual revenues if overinflated estimates are selected over accurate estimates.

Keeping this in mind, the present embodiments described herein may include providing each subdivision of an organization a virtual budget of some amount, maybe approximating the actual revenue of that department during a previous time period. When applying for resources, such as assets, each subdivision may provide a virtual bid that corresponds to an estimate of the revenues expected to receive for the project. The virtual bid may consist of a portion of the virtual budget. If the subdivision is given a job or project, the virtual budget may be reduced by the virtual bid. After the project is complete, the virtual budget may be increased by any surplus revenue that was actually realized over the virtual bid. On the other hand, if the actual revenue was less than the virtual bid, the virtual budget may be decreased by the deficiency.

Over time, the subdivisions that consistently overestimate the estimated revenues may have less virtual budget to bid for future projects. As a result, to get approval for a job or project, the subdivision may need to offer more virtual current for the resources than anyone else at the same time without going over what the subdivision will actually realize from the jobs. In this way, the organization is better safeguarded to actually realize the highest true revenue by receiving more accurate estimates. This leads to optimal utilization of the assets, and it also aligns the goals of the subdivisions to those of the organization, as a whole, so that the need of dishonest reporting is reduced due to the self-interest of everyone involved.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A method, comprising:
   identifying, via a processing system, a plurality of wellbore projects for performing hydrocarbon exploration or processing operations;
   identifying, via the processing system, a plurality of wellbore assets, usable to complete the plurality of wellbore projects;
   via a scheduling algorithm, determining, that a scheduling solution cannot be created that completes each wellbore project of the plurality of wellbore projects with the plurality of wellbore assets based on project timelines of the plurality of wellbore projects and based on asset travel times of the plurality of wellbore assets;

in response to determining that the scheduling solution cannot be created, generating a project graph comprising a plurality of nodes connected by a plurality of edges, wherein each node corresponds to a subset of the plurality of wellbore projects, respectively;

iteratively performing a plurality of rollouts via a rollout algorithm, wherein:

each rollout comprises a traversal of the project graph beginning from a different node that does not include any previously excluded subset of the plurality of wellbore projects;

each rollout independently traverses the project graph using a depth-first search algorithm to identify feasible subsets of the plurality of wellbore projects;

each rollout evaluates corresponding nodes with the scheduling algorithm to determine a feasibility of the corresponding nodes and determine whether an associated subset of wellbore projects can be completed using the plurality of wellbore assets; and iteratively performing the plurality of rollouts with the rollout algorithm further includes, at each iteration and based on the determined feasibility:

excluding, across all subsequent rollouts of the plurality of rollouts, any node including an infeasible subset; and excluding, across all subsequent rollouts of the plurality of rollouts, any node including a part of a feasible subset;

identifying, based on performing the plurality of rollouts, one or more scheduling solutions each comprising a respective feasible subset identified via the plurality of rollouts;

from the one or more scheduling solutions, selecting, based on an optimization algorithm with respect to revenue, a scheduling solution for deploying the plurality of wellbore assets to complete an associated feasible subset of the plurality of wellbore projects; and transmitting, via the processing system, the selected scheduling solution for deploying the plurality of wellbore assets.

2. The method of claim 1, further comprising deploying the plurality of wellbore assets in accordance with the selected scheduling solution to complete the associated feasible subset of the plurality of wellbore projects.

3. The method of claim 1, further comprising identifying information related to each asset of the plurality of wellbore assets, wherein the information comprises a type of a respective asset, a weight of the respective wellbore asset, dimensions of the respective wellbore asset, shipping instructions for the respective wellbore asset, a current location of the respective wellbore asset, or any combination thereof.

4. The method of claim 1, wherein the scheduling algorithm minimizes a use of a number of the plurality of wellbore assets for use with an associated subset of the plurality of wellbore projects.

5. A system, comprising:

a computing device comprising an electronic display; and a processing system comprising computer-executable instructions that, when executed, cause the processing system to perform operations comprising:

identifying a plurality of wellbore projects that corresponds to performing hydrocarbon exploration or processing operations;

identifying a plurality of wellbore assets usable to complete the plurality of wellbore projects;

via a scheduling algorithm, determining that a scheduling solution cannot be created that completes each wellbore project of the plurality of wellbore projects with the plurality of wellbore assets based on project timelines of the plurality of wellbore projects and based on asset travel times of the plurality of wellbore assets;

in response to determining that the scheduling solution cannot be created, generating a project graph comprising a plurality of nodes connected by a plurality of edges, wherein each node corresponds to a subset of the plurality of wellbore projects, respectively;

iteratively performing a plurality of rollouts via a rollout algorithm, wherein:

each rollout comprises a traversal of the project graph beginning from a different node that does not include any previously excluded subset of the plurality of wellbore projects;

each rollout independently traverses the project graph using a depth-first search algorithm to identify feasible subsets of the plurality of wellbore projects;

each rollout evaluates corresponding nodes with the scheduling algorithm to determine a feasibility of the corresponding nodes and determine whether an associated subset of wellbore projects can be completed using the plurality of wellbore assets; and iteratively performing the plurality of rollouts with the rollout algorithm further includes, at each iteration and based on the determined feasibility:

excluding, across all subsequent rollouts of the plurality of rollouts, any node including an infeasible subset; and excluding, across all subsequent rollouts of the plurality of rollouts, any node including a part of a feasible subset;

identifying, based on performing the plurality of rollouts, one or more scheduling solutions each comprising a respective feasible subset identified via the plurality of rollouts;

from the one or more scheduling solutions, selecting, based on an optimization algorithm with respect to revenue, a scheduling solution for deploying the plurality of wellbore assets to complete an associated feasible subset of the plurality of wellbore projects; and transmitting the selected scheduling solution for deploying the plurality of wellbore assets.

6. The system of claim 5, further comprising deploying the plurality of wellbore assets in accordance with the selected scheduling solution to complete the associated feasible subset of the plurality of wellbore projects.

7. The system of claim 5, further comprising identifying information related to each asset of the plurality of wellbore assets, wherein the information comprises a type of a respective asset, a weight of the respective wellbore asset, dimensions of the respective wellbore asset, shipping instructions for the respective wellbore asset, a current location of the respective wellbore asset, or any combination thereof.

8. The system of claim 5, wherein the scheduling algorithm minimizes a use of a number of the plurality of wellbore assets for use with the plurality of wellbore projects.

9. A non-transitory computer-readable medium comprising computer-executable instructions that, when executed, cause a processing system to perform operations comprising:
- identifying a plurality of wellbore projects that corresponds to performing hydrocarbon exploration or processing operations;
- identifying a plurality of wellbore assets usable to complete the plurality of wellbore projects;
- via a scheduling algorithm, determining that a scheduling solution cannot be created that completes each wellbore project of the plurality of wellbore projects with the plurality of wellbore assets based on project timelines of the plurality of wellbore projects and based on asset travel times of the plurality of wellbore assets;
- in response to determining that the scheduling solution cannot be created, generating a project graph comprising a plurality of nodes connected by a plurality of edges, wherein each node corresponds to a subset of the plurality of wellbore projects, respectively;
- iteratively performing a plurality of rollouts via a rollout algorithm, wherein:
  - each rollout comprises a traversal of the project graph beginning from a different node that does not include any previously excluded subset of the plurality of wellbore projects;
  - each rollout independently traverses the project graph using a depth-first search algorithm to identify feasible subsets of the plurality of wellbore projects;
  - each rollout evaluates corresponding nodes with the scheduling algorithm to determine a feasibility of the corresponding nodes and determine whether an associated subset of wellbore projects can be completed using the plurality of wellbore assets; and
  - iteratively performing the plurality of rollouts with the rollout algorithm further includes, at each iteration and based on the determined feasibility:
    - excluding, across all subsequent rollouts of the plurality of rollouts, any node including an infeasible subset; and
    - excluding, across all subsequent rollouts of the plurality of rollouts, any node including a part of a feasible subset;
- identifying, based on performing the plurality of rollouts, one or more scheduling solutions each comprising a respective feasible subset identified via the plurality of rollouts;
- from the one or more scheduling solutions, selecting, based on an optimization algorithm with respect to revenue, a scheduling solution for deploying the plurality of wellbore assets to complete an associated feasible subset of the plurality of wellbore projects; and
- transmitting the selected scheduling solution for deploying the plurality of wellbore assets.

10. The non-transitory computer-readable medium of claim 9, further comprising deploying the plurality of wellbore assets in accordance with the selected scheduling solution to complete the associated feasible subset of the plurality of wellbore projects.

11. The non-transitory computer-readable medium of claim 9, further comprising identifying information related to each asset of the plurality of wellbore assets, wherein the information comprises a type of a respective wellbore asset, a weight of the respective wellbore asset, dimensions of the respective wellbore asset, shipping instructions for the respective wellbore asset, a current location of the respective wellbore asset, or any combination thereof.

12. The non-transitory computer-readable medium of claim 9, wherein the scheduling algorithm minimizes a use of a number of the plurality of wellbore assets for use with the plurality of wellbore projects.

* * * * *